UNITED STATES PATENT OFFICE.

HENRY C. TODD AND CHARLES MAYR, OF CHICAGO, ILLINOIS, SAID MAYR, ASSIGNOR TO SAID TODD.

ASBESTOS COMPOSITION.

No. 796,164.     Specification of Letters Patent.     Patented Aug. 1, 1905.

Application filed November 12, 1904. Serial No. 232,521.

*To all whom it may concern:*

Be it known that we, HENRY C. TODD and CHARLES MAYR, citizens of the United States, and residents of Chicago, in the county of Cook and State of Illinois, have invented certain new and useful Improvements in Asbestos Compositions; and we do hereby declare that the following is a full, clear, and exact description thereof.

This invention relates to a novel fireproof composition in which asbestos is the principal ingredient and which is adapted for use in cases where a strong and durable fireproof and waterproof material is required.

The invention also includes the method or process of making such composition.

The composition made in accordance with our invention consists of asbestos and silico-aluminate of soda, the silico-aluminate of soda being adherent to the filaments of asbestos in the form of a coating or covering and constituting a binding material which fills the interstices between the asbestos filaments and unites said filaments into a solid mass. The silico-aluminate of soda being insoluble in water, the composition is both fireproof and waterproof and is also exceedingly hard, tough, and strong.

In the manufacture of the composition any form of commercial asbestos may be used, and the asbestos is first formed into sheets or special articles by any of the processes usually used in the manufacture of asbestos for commercial uses, the asbestos fibers being combined with such admixture of binding or cementing material as is necessary to hold or bind the same together or to give solid or permanent form to the sheets or articles, as heretofore common in this art. Silicate of alumina and silicate of soda in powdered or pulverulent form are then mixed with water, the mixture being stirred so as to give it uniform consistency, and the asbestos sheets or articles are then immersed in the mixture. The silicate of alumina and silicate of soda will not be immediately dissolved by the water, but will be held in suspension therein, and at point of the process there will be no chemical reaction between the ingredients constituting the mixture. Silicate of alumina well adapted for use in the manufacture of our novel product is found as a natural product in southwestern Missouri and Tennessee, the formula of which is approximately $Al_2O_3(SiO_2)_2 + 2aq$; but we have no doubt that silicate of alumina having like characteristics and of substantially the same formula may be found in other places. It will of course be understood that by chemical analysis the fitness of silicate of alumina as found in its natural condition for use in carrying out our novel process may be readily determined. So far as we have been able to determine the silicate of soda should contain at least thirty per cent. of $Na_2O$. We have found that good results are obtained when the ingredients above referred to are used in proportion as follows: water, one thousand gallons; silicate of alumina, fifteen hundred pounds; silicate of soda, eight hundred pounds. The asbestos in sheets or in the form of specially shaped or molded articles is then dipped or immersed in the mixture and allowed to remain therein until well impregnated therewith. The asbestos being porous in character, said mixture will penetrate the asbestos and fill the spaces or interstices between the fibers thereof, it being understood that inasmuch as the solid constituents of the mixture are very finely pulverized and as the water acts as a vehicle therefor the admixture will permeate the sheet or mass of asbestos being treated and at the same time coat or cover the individual asbestos fibers in said sheets or mass. After being well impregnated with the mixture the asbestos sheet or article is allowed to dry and is then subjected to a gradually-increasing heat until it reaches a temperature approximately 800° Fahrenheit. The water originally contained in the mixture is driven off in drying the article, and the effect of the heat upon the dried admixture of silicate of alumina and silicate of soda is to produce a molecular combination without fusion—that is to say, through the influence of a temperature not higher than 800° Fahrenheit continued for the necessary period of time a chemical union takes place between the silicates of soda and alumina, producing ultimately the sodium-alumina silicate in a solid coherent form, and such sodium-alumina silicate will be adherent to the asbestos fibers and form a coating thereon, as well as a filling between the interstices thereof. It follows that the sodium-alumina silicate will act to unite or cement together the individual fibers or filaments of the asbestos, as well as cover or coat such fibers or filaments so that the resulting product is hard and tough in character and is solid except so far as the sheet or article may have been intentionally made cellular or porous, as is often done in making sheet-asbestos for various purposes. In such baking operation the heat is gradually applied and will usually be continued for a considerable period of time, depending on the nature and characteristics of the materials used. With some natural silicates of alumina and when the baking is accomplished at temperatures considerably lower than 800° Fahrenheit it is in some cases necessary to continue the baking operation for from two to four weeks. We have found that in the use of silicate of alumina obtained from natural sources and having substantially the chemical formula as above indicated in connection with silicate of soda having the characteristics hereinbefore described that during the baking operation a chemical reaction takes place according to the following formula:

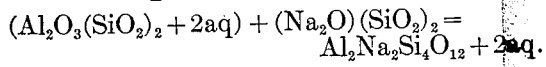

$$(Al_2O_3(SiO_2)_2 + 2aq) + (Na_2O)(SiO_2)_2 = Al_2Na_2Si_4O_{12} + 2aq.$$

Such chemical reaction in the baking process produces a specific compound, our understanding being that one $H_2O$ is retained even if the temperature is above 600° Fahrenheit and that in the resulting compound the chemical union of silicate of alumina and silicate of soda is a true sodium-alumina silicate.

The sheets or articles constituting the product of the process above described possess novel and valuable properties. The product when in the form of sheets or other articles while capable of resisting fire of about 2,000° Fahrenheit is also waterproof. Moreover, it is exceedingly strong and tough in character and capable of use in cases where great strength is required. Moreover, the product in sheet form or in the form of special articles may be molded or shaped originally either in solid form or with air-spaces or of cellular structure, so that the material will be both light and strong, while possessing only slight heat-conducting capacity. The product is, moreover, waterproof and capable of resisting the action of the elements for any length of time, so that it may be used out of doors or when exposed constantly to the action of the elements.

The silico-aluminate of soda produced by the process herein described differs from other substances generally included under the same term which are produced by fusion of the components of the mixture because it can be carried out only by the use of a silicate of alumina of the general character hereinbefore set forth—that is to say, a form of silicate of alumina capable of uniting by chemical reaction with the silicate of soda when subjected to a temperature of about 800° Fahrenheit or less. The silico-aluminate of soda produced in carrying out our process is therefore the chemical substance formed by the molecular combination of silicate of alumina and silicate of soda produced by chemical reaction under a temperature of about 800° Fahrenheit or less and without fusion.

We claim as our invention—

1. A composition consisting of asbestos fibers and silico-aluminate of soda produced at a temperature of about 800° Fahrenheit or less.

2. An asbestos sheet or article in which the asbestos fibers are united or cemented together by silico-aluminate of soda produced at a temperature of about 800° Fahrenheit or less.

3. An asbestos sheet or article in which the asbestos fibers are coated with and cemented together by silico-aluminate of soda produced at a temperature of about 800° Fahrenheit or less.

4. As a new product, asbestos fibers coated with silico-aluminate of soda which fills the spaces or interstices between the asbestos fibers and forms therewith a solid mass or body, said silico-aluminate of soda being produced under a temperature of about 800° Fahrenheit or less.

5. The process of making an asbestos composition which consists in coating the asbestos fibers and filling the spaces between the same with an admixture containing silicate of alumina and silicate of soda and thereafter baking the composition at a temperature of about 800° Fahrenheit or less.

6. The process of making an asbestos composition which consists in applying to the asbestos fibers an admixture consisting of pulverized silicate of alumina, silicate of soda and water, and thereafter drying and baking the same under a temperature of 800° Fahrenheit or less.

7. The process of making an asbestos composition which consists in preparing an admixture of pulverized silicate of alumina, silicate of soda and water, impregnating a mass of asbestos fibers with said admixture, drying the mass to remove the water and subjecting the mass to heat at a temperature of about 800° Fahrenheit or less.

8. The process which consists in forming a sheet or article of asbestos fibers, coating the fibers and filling the spaces between the same with an admixture consisting of pulverized silicate of alumina, silicate of soda and water, and thereafter baking the sheet or article under a temperature of about 800° Fahrenheit or less.

9. The process which consists in forming a sheet or article of asbestos fibers, preparing a mixture of pulverized silicate of alumina, silicate of soda and water, impregnating the asbestos sheet or article with such admixture, drying the sheet or article to remove the water, and subjecting the same to heat of about 800° Fahrenheit or less.

In testimony that we claim the foregoing as our invention we affix our signatures, in presence of two witnesses, this 10th day of November, A. D. 1904.

HENRY C. TODD.
CHARLES MAYR.

Witnesses:
C. CLARENCE POOLE,
GEORGE R. WILKINS.